(No Model.)
W. BERRY.
SASH BALANCE.
No. 470,655. Patented Mar. 15, 1892.
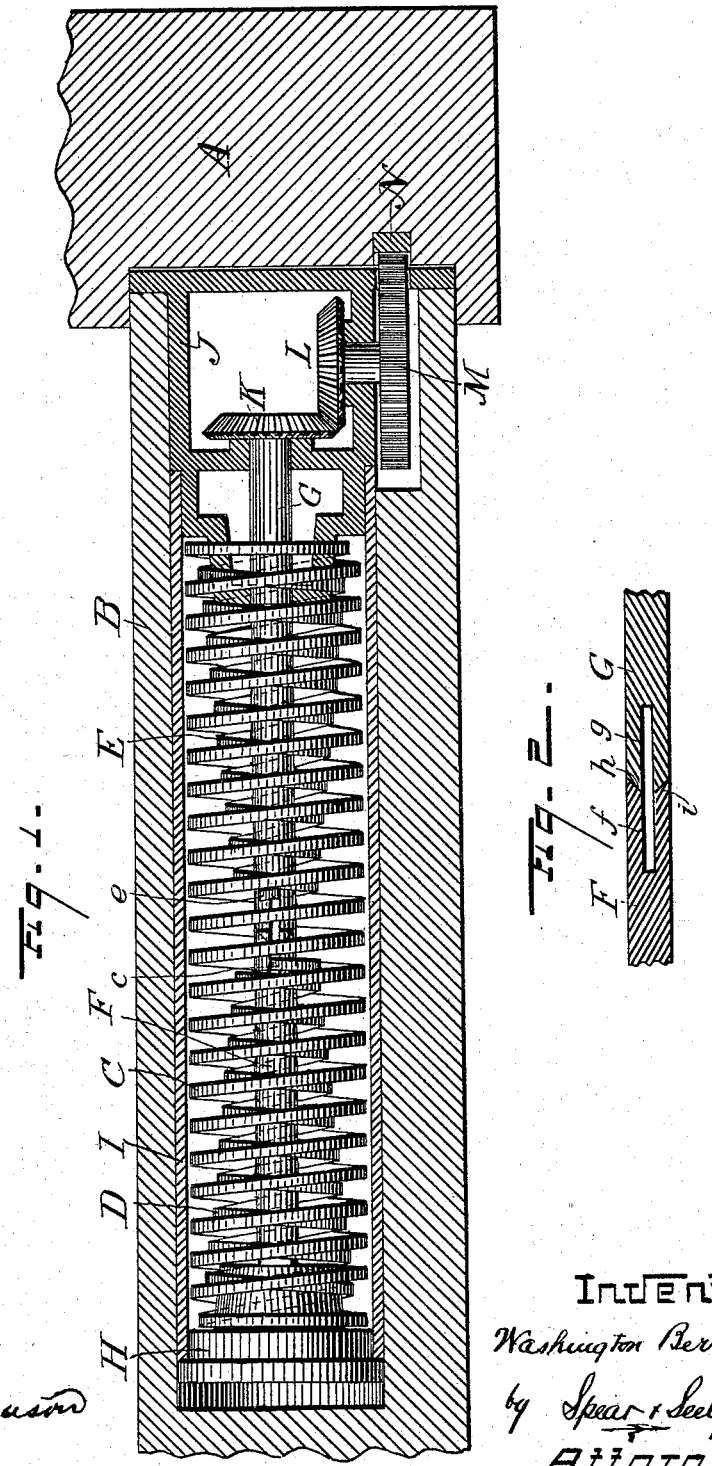
Witnesses
As. Paré
G. H. Ferguson
Inventor
Washington Berry
by Spear & Seely,
Attorneys

United States Patent Office.

WASHINGTON BERRY, OF ANGEL ISLAND, CALIFORNIA.

SASH-BALANCE.

SPECIFICATION forming part of Letters Patent No. 470,655, dated March 15, 1892.

Application filed November 6, 1890. Serial No. 370,580. (No model.)

*To all whom it may concern:*

Be it known that I, WASHINGTON BERRY, a citizen of the United States, residing at Angel Island, Marin county, State of California, have invented certain new and useful Improvements in Sash-Balances; and I do hereby declare that the following is a full, clear, and exact description of the said invention.

My invention relates to sash-balances of the class in which the weight of a sash is balanced by the force exerted by a spring put under torsional strain when the window is lowered and acting, when the window is raised, upon a rack-and-pinion gearing between the window-sash and its frame. It relates particularly, however, to an improved form of spring, the purpose of which is to obtain in small compass a large amount of torsional strength and power and to apply such power gradually and smoothly without sudden shocks or jerks.

My invention consists, first, in the construction of the spring, and, secondly, in the manner of attaching and connecting it so that it may operate as a sash-balance.

For a full comprehension of the invention reference must be made to the following detailed description and to the accompanying drawings, in which—

Figure 1 represents a horizontal section of a window-sash and rail with my spring operating as a sash-balance, and Fig. 2 a longitudinal section showing the meeting ends of the rods to which the spring is attached.

A represents a portion of a window-casing, and B a window-sash rail, both of ordinary construction. The sash-rail is recessed or chambered at one corner and from the bottom of the recess is bored out or rabbeted longitudinally a sufficient distance to receive the spring C. This spring is composed of a single piece of elastic metal coiled spirally, as shown in the drawings—that is to say, commencing, for example, at the end e, a progressive spiral coil E is formed for a sufficient distance, each successive coil preferably increasing in diameter. The spring is then returned upon itself, still progressing spirally, to a distance beyond the end e, where it is returned within itself, preferably tapering, and terminates at the end c, which thus approaches the end e.

In applying my spring to a sash-balance I prefer to use it in connection with gearing like that described in my application for Letters Patent, Serial No. 367,685, filed October 10, 1890, and I have in the drawings shown such gearing; but it is of course not absolutely essential that this particular means of applying the torsional force should be used.

The spring is put under torsional strain by the rotation of a rod or spindle G, having bearings in a casting J, which is inserted into and closes the opening in the recess of the sash-rail. The rod G carries a beveled pinion K, which engages with a similar pinion L, also journaled in a bearing formed in the casting J. Upon the spindle of this pinion L is the main spur-pinion M, which gears into the rack N in the sash-run. The motion of the window up or down thus communicates a rotary movement to the spindle G, to which the end e of the spring is attached. The other end c of the spring is connected to the stationary rod F, secured in any suitable manner at the end of the bore in the sash-rail, but preferably by means of a removable block H, which is rigidly fixed in any suitable way. The detail view, Fig. 2, shows the meeting ends of the rods F and G and the conical bearing which permits the free revolution of rod G. Slots f g are formed in said rods at or near the meeting ends, through which pass the ends c and e of the spring, respectively. This facilitates the putting together of the parts, and also affords a very secure connection between the springs and the rods. The extremities of the springs are bent laterally, and when the rods are introduced their slotted ends are slipped over the laterally-bent ends of the springs. The rods are held against longitudinal movement, and thus the ends of the springs are held securely in place. The movable rod is sustained at its inner end by the bearing which it has in the end of the fixed rod.

I represents a bushing for the bore in the sash-rail similar to that described in my application previously referred to.

It will be seen that all the parts of my device may be put together and inserted as a whole into the sash and removed therefrom, and also that it may be applied to any of the four sash-rails upon either upper or lower sash, or both, the operation under all these circumstances being precisely similar.

The operation of the device requires no extended description. When the parts are connected, the lowering of the window winds up the spring and stores in it an amount of torsional force substantially equal to the weight of the sash. This force, when the window is raised, exerts itself upon the spur-pinion, which is thus caused to travel in the rack and assists in the moving of the sash.

I desire it to be understood that I limit myself in the present case to what I have particularly claimed, for the reason that the devices which I have shown and described but not claimed herein constitute the subject-matter of a pending application.

While I have described this spring as particularly adapted to the operation of window-sash balances, its usefulness is not confined to that class of mechanical devices, but it may be applied and used in various other situations where torsional force is a desirable way of furnishing power.

Having described my invention, I claim—

1. In combination, the torsion-spring for balancing the sash, a fixed rod extending within the spring, to which the end of the spring is attached, said rod having a seat at its end, and a rotary rod to which the other end of the spring is connected, having its end seated in the end of the stationary rod, substantially as described.

2. In a sash-balancing device, the combination of a recessed sash-rail, a torsion-spring therein having an external and two internal coils, substantially as described, a fixed rod and a rotary rod passing through and connected, respectively, to the internal coils, gearing connecting said rotary rod with a rack on the window-casing, and a casting for entering and closing the recess in the sash-rail and having bearings for said rotary rod and said gearing, substantially as described and shown.

3. A torsion-spring consisting of a cylindrical coil with interior returning ends, one end being secured to a fixed rod extending axially within the coil and the other end to a rotary rod in line therewith extending inwardly from the opposite end and having a power-transmitting device, and a bearing for the rotary rod, all substantially as described.

In testimony whereof I have hereunto affixed my signature, in the presence of two witnesses, this 31st day of October, 1890.

WASHINGTON BERRY.

Witnesses:
L. W. SEELY,
LEE D. CRAIG.